United States Patent
Thomas

(10) Patent No.: US 12,526,598 B2
(45) Date of Patent: Jan. 13, 2026

(54) METHODS AND APPARATUS TO GENERATE SPATIAL AUDIO BASED ON COMPUTER VISION

(71) Applicant: Intel Corporation, Santa Clara, CA (US)

(72) Inventor: Tigi Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 17/475,235

(22) Filed: Sep. 14, 2021

(65) Prior Publication Data

US 2022/0007127 A1 Jan. 6, 2022

(51) Int. Cl.
| H04S 7/00 | (2006.01) |
| G06T 7/70 | (2017.01) |
| G06T 11/00 | (2006.01) |
| G06V 40/16 | (2022.01) |
| H04S 1/00 | (2006.01) |

(52) U.S. Cl.
CPC ............... *H04S 7/303* (2013.01); *G06T 7/70* (2017.01); *G06T 11/00* (2013.01); *G06V 40/161* (2022.01); *H04S 1/002* (2013.01); *H04S 1/007* (2013.01); *G06T 2207/30201* (2013.01); *G06T 2210/12* (2013.01); *H04S 2400/11* (2013.01); *H04S 2400/15* (2013.01); *H04S 2420/01* (2013.01)

(58) Field of Classification Search
CPC ............. G06T 7/73; G06T 7/70; G06T 11/00; G06T 2207/30201; G06T 2210/12; H04S 7/303; H04S 1/002; H04S 1/007; H04S 2400/11; H04S 2400/15; H04S 2420/01; G06V 40/161; G06F 2218/22; H04R 27/00
See application file for complete search history.

(56) References Cited

U.S. PATENT DOCUMENTS

| 4,811,404 A | 3/1989 | Vilmur |
| 5,978,080 A * | 11/1999 | Michael ............... G01B 11/002 356/243.1 |
| 6,363,344 B1 | 3/2002 | Higuchi |

(Continued)

FOREIGN PATENT DOCUMENTS

| CN | 111754990 A | 10/2020 |
| WO | 2011123757 A1 | 10/2011 |
| WO | 2022067293 A1 | 3/2022 |

OTHER PUBLICATIONS

Warusfel, "Listen HRTF Database," dated Sep. 6, 2002, updated May 25, 2003, retrieved from http://recherche.ircam.fr/equipes/salles/listen/, 1 page.

(Continued)

*Primary Examiner* — Carolyn R Edwards
*Assistant Examiner* — Kuassi A Ganmavo
(74) *Attorney, Agent, or Firm* — Hanley, Flight & Zimmerman, LLC

(57) ABSTRACT

Methods, apparatus, systems, and articles of manufacture are disclosed to generate spatial audio based on computer vision. An example apparatus includes at least one memory, instructions in the apparatus, and processor circuitry to execute the instructions to determine a position of an audio source based on an image generated via a camera, and apply an audio spatialization filter to an audio signal generated by a microphone based on the position of the audio source.

20 Claims, 10 Drawing Sheets

(56) References Cited

U.S. PATENT DOCUMENTS

| | | | | |
|---|---|---|---|---|
| 6,593,956 | B1* | 7/2003 | Potts | H04N 7/15 |
| | | | | 348/E7.083 |
| 8,681,203 | B1 | 3/2014 | Yin | |
| 9,197,974 | B1 | 11/2015 | Clark | |
| 9,298,974 | B1* | 3/2016 | Kuo | H04N 13/239 |
| 10,027,883 | B1* | 7/2018 | Kuo | H04N 23/63 |
| 10,027,888 | B1 | 7/2018 | Mackraz | |
| 10,440,324 | B1 | 10/2019 | Lichtenberg | |
| 10,819,950 | B1 | 10/2020 | Lichtenberg et al. | |
| 10,820,795 | B1 | 11/2020 | Weise | |
| 11,252,374 | B1 | 2/2022 | Lichtenberg et al. | |
| 2003/0035001 | A1* | 2/2003 | Van Geest | H04N 19/597 |
| | | | | 348/E13.058 |
| 2008/0002948 | A1* | 1/2008 | Murata | H04S 1/005 |
| | | | | 386/338 |
| 2008/0136895 | A1 | 6/2008 | Mareachen | |
| 2008/0260131 | A1* | 10/2008 | Akesson | H04M 3/568 |
| | | | | 379/202.01 |
| 2008/0279425 | A1 | 11/2008 | Tang | |
| 2009/0015658 | A1* | 1/2009 | Enstad | H04N 7/15 |
| | | | | 348/240.99 |
| 2009/0189783 | A1* | 7/2009 | Koitabashi | G06T 7/579 |
| | | | | 340/937 |
| 2010/0123785 | A1* | 5/2010 | Chen | H04N 23/611 |
| | | | | 382/118 |
| 2011/0161074 | A1 | 6/2011 | Pance | |
| 2011/0304693 | A1* | 12/2011 | Border | H04N 13/261 |
| | | | | 348/46 |
| 2011/0316996 | A1* | 12/2011 | Abe | H04S 7/303 |
| | | | | 348/E7.085 |
| 2012/0150333 | A1 | 6/2012 | De Luca | |
| 2012/0183161 | A1* | 7/2012 | Agevik | H04S 7/302 |
| | | | | 381/303 |
| 2013/0156209 | A1 | 6/2013 | Visser | |
| 2013/0202130 | A1 | 8/2013 | Zurek | |
| 2014/0085446 | A1* | 3/2014 | Hicks | G09B 21/001 |
| | | | | 348/62 |
| 2014/0169627 | A1 | 6/2014 | Gupta | |
| 2014/0337016 | A1 | 11/2014 | Herbig | |
| 2014/0341547 | A1* | 11/2014 | Shenoy | H04N 23/60 |
| | | | | 386/285 |
| 2015/0131803 | A1 | 5/2015 | Weksler | |
| 2015/0264299 | A1 | 9/2015 | Leech | |
| 2015/0296319 | A1 | 10/2015 | Shenoy | |
| 2016/0073054 | A1 | 3/2016 | Balasaygun | |
| 2016/0195856 | A1 | 7/2016 | Spero | |
| 2017/0186441 | A1* | 6/2017 | Wenus | H04N 7/147 |
| 2017/0201825 | A1* | 7/2017 | Whyte | H04N 23/69 |
| 2018/0084365 | A1* | 3/2018 | Ugur | G06F 3/167 |
| 2018/0144746 | A1 | 5/2018 | Mishra et al. | |
| 2018/0310114 | A1* | 10/2018 | Eronen | H04R 1/406 |
| 2019/0172462 | A1 | 6/2019 | Mishra | |
| 2019/0313014 | A1 | 10/2019 | Welbourne | |
| 2019/0317594 | A1* | 10/2019 | Stent | G05D 1/0274 |
| 2019/0394606 | A1* | 12/2019 | Tammi | G10L 19/008 |
| 2020/0028884 | A1 | 1/2020 | Childers | |
| 2020/0110572 | A1 | 4/2020 | Lenke | |
| 2020/0137489 | A1* | 4/2020 | Sheaffer | H04R 5/04 |
| 2020/0145617 | A1 | 5/2020 | Zavesky | |
| 2020/0184987 | A1 | 6/2020 | Kupryjanow et al. | |
| 2020/0314483 | A1 | 10/2020 | Rakshit | |
| 2020/0393159 | A1 | 12/2020 | Takayanagi | |
| 2021/0092517 | A1 | 3/2021 | Kulkarni et al. | |
| 2021/0116983 | A1 | 4/2021 | Hallberg et al. | |
| 2021/0318850 | A1 | 10/2021 | Thomas | |
| 2022/0059071 | A1 | 2/2022 | Pearce | |
| 2022/0060525 | A1 | 2/2022 | Chavez | |
| 2022/0159403 | A1* | 5/2022 | Sporer | H04S 7/304 |
| 2022/0239848 | A1 | 7/2022 | Swierk | |
| 2022/0295012 | A1 | 9/2022 | Swierk | |
| 2022/0319063 | A1 | 10/2022 | Mizobuchi | |
| 2023/0103060 | A1* | 3/2023 | Chaudhuri | G06V 20/41 |
| | | | | 382/118 |

OTHER PUBLICATIONS

United States Patent and Trademark Office, "Notice of Allowance and Fee(s) Due," issued in connection with U.S. Appl. No. 17/358,894, dated May 13, 2025, 14 pages.

United States Patent and Trademark Office, "Notice of Allowance and Fee(s) Due," issued in connection with U.S. Appl. No. 17/483,552, dated Jul. 1, 2025, 9 pages.

Feng et al., "Face Detection, Bounding Box Aggregation and Pose Estimation for Robust Facial Landmark Localisation in the Wild," 2017 IEEE Conference on Computer Vision and Pattern Recognition Workshops (CVPRW), 2017, pp. 160-169, 10 pages.

"A Method and Apparatus for Smart Auto-Mute of Conference Participants," IP.com Prior Art Database Technical Disclosure, May 1, 2014, 12 pages.

European Patent Office, "European Search Report," issued in connection with European patent application No. 22191774.3, Feb. 20, 2023, 8 pages.

United States Patent and Trademark Office, "Non-Final Office Action," issued in connection with U.S. Appl. No. 17/358,894, dated Jul. 19, 2024, 21 pages.

United States Patent and Trademark Office, "Non-Final Office Action," issued in connection with U.S. Appl. No. 17/483,552, dated Oct. 25, 2024, 9 pages.

United States Patent and Trademark Office, "Final Office Action," issued in connection with U.S. Appl. No. 17/358,894, dated Nov. 14, 2024, 27 pages.

United States Patent and Trademark Office, "Final Office Action," issued in connection with U.S. Appl. No. 17/483,552, dated Feb. 13, 2025, 12 pages.

European Patent Office, "Communication pursuant to Article 94(3) EPC," issued in connection with European Patent Application No. 22191774.3, Mar. 10, 2025, 7 pages.

United States Patent and Trademark Office, "Notice of Allowance and Fee(s) Due," issued in connection with U.S. Appl. No. 17/358,894, dated Apr. 7, 2025, 14 pages.

* cited by examiner

METHODS AND APPARATUS TO GENERATE SPATIAL AUDIO BASED ON COMPUTER VISION

FIELD OF THE DISCLOSURE

This disclosure relates generally to audio processing and, more particularly, to methods and apparatus to generate spatial audio based on computer vision.

BACKGROUND

An electronic user device, such as a laptop computer, includes one or more audio output devices (e.g., speakers) to output audio. The audio output devices can be used during a video presentation in which an image of an audio source, such as a person speaking, is captured via a camera of another electronic user device.

Figure 1A:
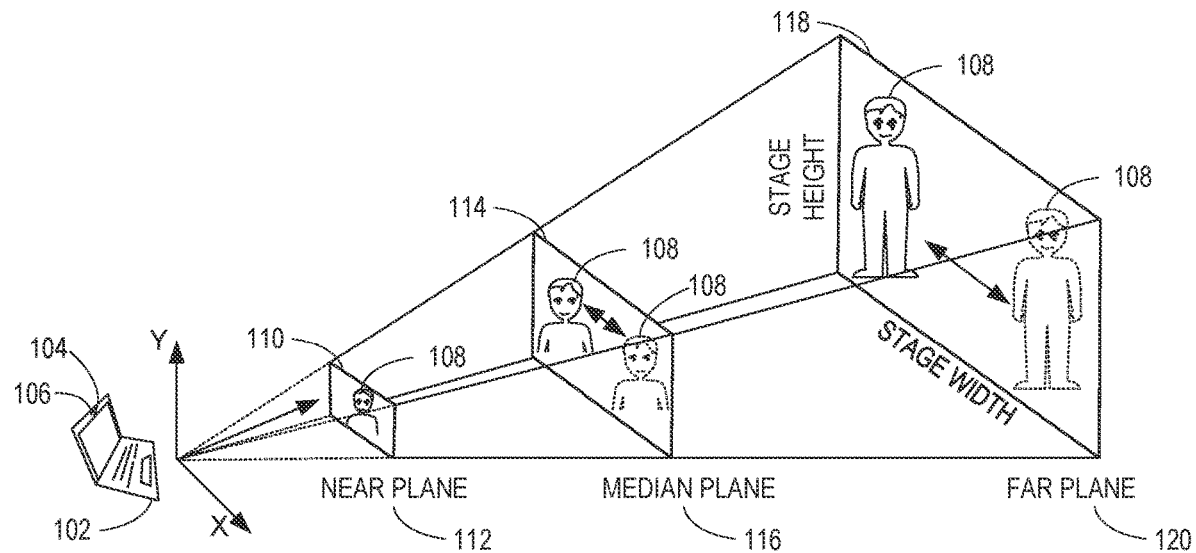
FIG. 1A illustrates an example input device constructed in accordance with the teachings of this disclosure and, in particular, illustrates an audio source positioned at a plurality of proximity values relative to the input device.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An input device (e.g., a laptop, tablet, or smartphone) includes a microphone and a camera. The microphone (e.g., a built-in microphone array, a separate microphone that is an accessory to the input device, a microphone associated with a headset, etc.) captures audio associated with an audio source near the input device. The camera (e.g., a built-in video camera, a separate camera that is an accessory to the input device, etc.) captures images of the environment of the input device (e.g., images including the audio source). An electronic user device such as a laptop, tablet, or smartphone includes one or more speakers (e.g., built-in speakers, external speakers, external headset, etc.) to output sound such as audio captured by the microphone of the first user device. The user device includes a display screen to display images such as images captured by the camera of the input device. The input device and the user device may include user applications such as a video conferencing application installed thereon. During a video conference, the microphone of the input device captures audio associated with an audio source near the input device. Additionally, the camera of the input device captures images of the environment of the input device. During the video conference, the speaker(s) of the user device output the audio captured by the microphone of the input device. Additionally, the display screen of the user device displays images captured by the camera of the input device.

In some instances, the microphone of the input device captures substantially uniform audio signals irrespective of the location of the audio source. For example, the microphone can be a single microphone which can only capture monaural (i.e., mono) audio. In another example, the microphone can be one or more microphones (e.g., a single microphone or a microphone array), however, the microphone (e.g., a wireless headset) maintains a fixed location relative to the audio source. Thus, uniform audio signals are captured irrespective of the location of the audio source. However, in some examples, the audio source can move (e.g., laterally and/or in proximity) relative to the camera. For example, the audio source can be a user of the input device wherein the user is speaking and generating voice audio. In some examples, the user can move relative to the camera laterally, toward the camera, and/or away from the camera. In some examples, if the microphone can only capture mono audio and/or the microphone maintains a fixed location relative to the audio source, the movement of the user has no effect on the audio signals captured by the microphone. In the examples where uniform audio signals are captured by the microphone, the speakers of the second user device output uniform sound. For example, the sound output on a right speaker (e.g., right external speaker, right ear portion of a headset, etc.) is the same as the sound output on a left speaker (e.g., left external speaker, left ear portion of a headset, etc.).

However, this example is not representative of an in-person interaction of an observer (e.g., the user of the user device) with an audio source, in particular, a moving audio source. For example, the observer can be facing an audio source that is offset to the right hand side of the observer. When the audio source generates audio, the observer perceives a position of the audio source. The position of the audio source is determined by the observer based on differences in time-of-arrival and sound-pressure-level of the audio signal to the observer's right ear versus the observer's left ear. For example, the time-of-arrival of the audio signal to the observer's right ear will be earlier than the time-of-arrival of the audio signal to the observer's left ear. Additionally, the sound-pressure-level of the audio signal on the observer's right ear will be higher than the sound-pressure-level of the audio signal on the observer's left ear. The observer can triangulate a position of the audio source based on these differences. In another example, the audio source can move from the observer's right hand side to the observer's left hand side. During this movement, the changing differences in the time-of-arrival and sound-pressure-level to the observer's right ear and left ear allow the observer to determine that the audio source has changed positions and is now located on their left hand side.

Some known electronic devices include stereophonic sound (i.e., stereo) audio to produce audio spatialization which replicates the effects of in-person interactions of observers and audio sources described above. Stereo audio can be recorded using a set of two or more microphones in a known arrangement (e.g., stereo microphones). By using two or more microphones, time-of-arrival and sound-pressure-level differences at two or more locations can be captured. The audio signals captured by the stereo microphones can be used to generate two or more audio output tracks (e.g., a right output track and a left output track). The two or more audio output tracks can be output on two or more speakers (e.g., a left external speaker and a right external speaker, a left ear portion of a headset and a right ear portion of a headset, etc.). The two or more audio tracks output on the two or more speakers can create a stereo effect including localization information (e.g., spatial audio). In the examples wherein a microphone is not capable of capturing stereo audio (e.g., a single microphone set-up) or a microphone (e.g., a headset microphone) maintains a fixed location relative to the audio source, stereo audio cannot be captured and spatial audio cannot be output.

Disclosed herein are example apparatus, systems, and methods that provide for audio spatialization based on a spatial location of an audio source relative to a camera associated with an input device. In examples disclosed herein, image data is generated by the camera associated with the input device (e.g., a built-in video camera, a separate camera that is an accessory to the user device) during, for instance, a video conference. Also, during the video conference, an audio signal associated with an audio source (e.g., a user of the input device) is captured via a microphone associated with the device (e.g., built-in microphone, head-set microphone, etc.). Examples disclosed herein include audio source spatial detection circuitry to analyze the image to detect a spatial location of the audio source. Examples disclosed herein apply audio spatialization to the audio signal based on the spatial location of the audio source.

FIG. 1A illustrates an example input device 102 constructed in accordance with the teachings of this disclosure. In the example of FIG. 1, the input device 102 is a laptop. In other examples, the input device 102 can include other types of personal computing (PC) devices such as a desktop, an electronic tablet, a hybrid or convertible PC, etc. In other examples, the input device 102 can be a smartphone. The example input device 102 includes a camera 104. The camera 104 can generate image data during operation of the input device 102 (e.g., during a video conference). In the example of FIG. 1A, the camera 104 is integrated with a housing of the input device 102. In other examples, the camera 104 (e.g., a webcam) can be removably coupled to the input device 102. The example input device 102 includes a microphone 106. The microphone 106 can detect (e.g., capture) audio signals in the environment in which the user device 102 is located. In the example of FIG. 1A, the microphone 106 is integrated with the housing of the input device 102. In other examples, the microphone 106 (e.g., a headset microphone) is removably coupled (e.g., wirelessly and/or wired) to the input device 102.

In the example of FIG. 1A, the camera 104 of the input device 102 captures images of an audio source. In the example of FIG. 1A, the audio source is a user 108 of the input device 102. In FIG. 1, the user 108 is illustrated within a plurality of example images corresponding to a plurality of distances (e.g., proximity values) relative to the camera 104. For example, the user 108 is shown in an example image 110 corresponding to a near plane 112. Additionally, the user 108 is shown in an example image 114 corresponding to a median plane 116. The median plane 116 is located at a distance further from the camera 104 than the near plane 112. Because the median plane 116 is located at a distance further from the camera 104 than the near plane 112, the user 108 appears smaller in the image 114 associated with the median plane 116 than in the image 110 associated with the near plane 112. Additionally, because the median plane 116 is located at a distance further from the camera 104 than the near plane 112, a lateral distance (e.g., width) captured in the image 114 is greater than a lateral distance (e.g., width) captured in the image 110. Thus, the user 108 can be captured at a plurality of lateral positions in the image 114 associated with the median plane 116.

Additionally, the user 108 is shown in example image 118 corresponding to a far plane 120. The far plane 120 is located at a distance further from the camera 104 than the median plane 116. Because the far plane 120 is located at a distance further from the camera 104 than the median plane 116, the user 108 appears smaller in the image 118 associated with the far plane 120 than in the image 114 associated with the median plane 116. Additionally, because the far plane 120 is located at a distance further from the camera 104 than the median plane 116, a lateral distance (e.g., width) captured in the image 118 is greater than a lateral distance (e.g., width) captured in the image 114. Thus, the user 108 can travel a greater distance laterally within the image 118 associated with the far plane 120 than in the image 114 associated with the median plane 116.

Figure 1B:
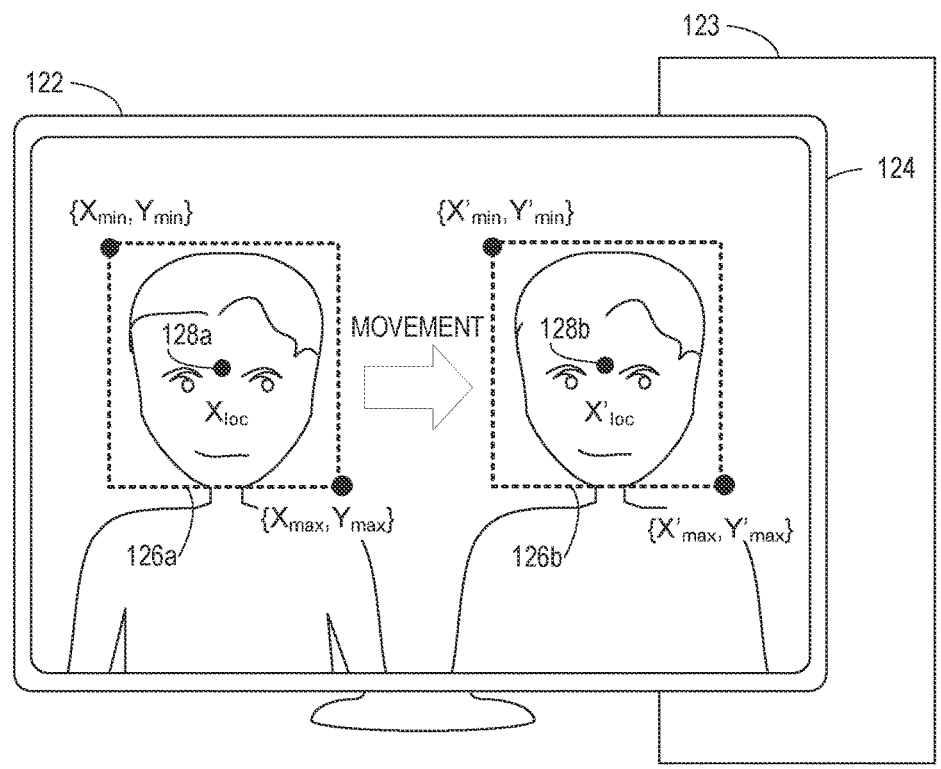
FIG. 1B illustrates a display screen of an example user device and, in particular, illustrates the audio source positioned at a plurality of lateral locations on the display screen.

FIG. 1B illustrates a display screen 122 of an example user device 123. The example display screen 122 of FIG. 1B displays an image 124 including the user 108 of the input device 102. In FIG. 1B, the user 108 is shown in a first position and a second position. In the first position, a face detection algorithm detects a face of the user 108a and generates a bounding box 126a. A size of the bounding box 126a corresponds to a size of the face of the user 108a in the image 124 and a position of the bounding box 126a corresponds to a position of the face of the user 108a in the image 124. The example bounding box 126a can be defined by a set of coordinates, $\{X_{min}, Y_{min}\}$ and $\{X_{max}, Y_{max}\}$. In the example of FIG. 1B, a first lateral position 128a of the user 108a is $X_{loc}$, an average of $X_{min}$ and $X_{max}$. The user 108 can travel from the first position to the second position. In the second position, the face detection algorithm generates a bounding box 126b corresponding to the user 108b in the second position. The example bounding box 126b can be defined by a set of coordinates, $\{X'_{min}, Y'_{min}\}$ and $\{X'_{max}, Y'_{max}\}$. In the example of FIG. 1B, a second lateral position 128b of the user 108b is $X'_{loc}$, an average of $X'_{min}$ and $X'_{max}$.

Figure 2A:
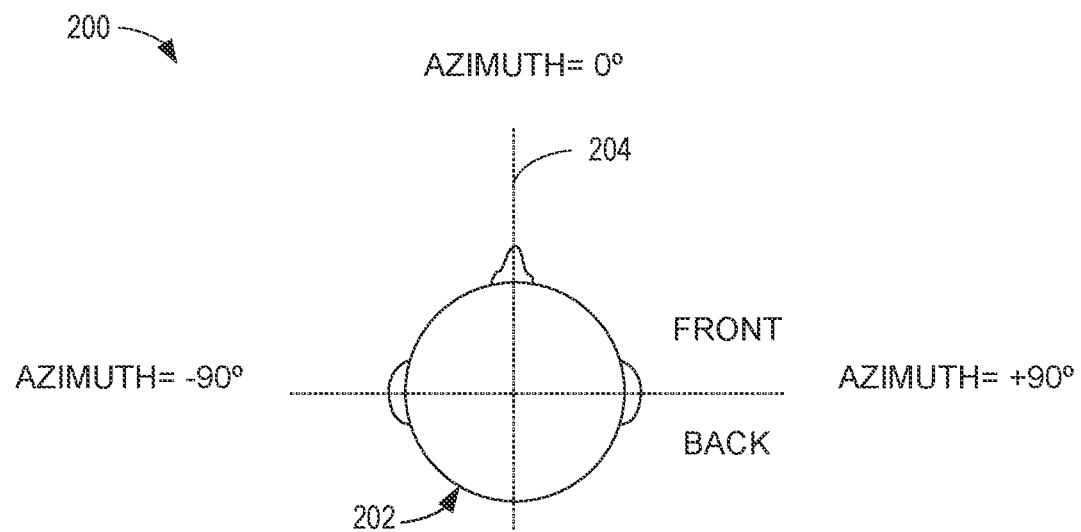
FIG. 2A illustrates a top view example user of the user device and, in particular, illustrates a lateral audio localization angle.

FIG. 2A illustrates an image 200 of a top view of an example user 202 of the user device 123 and, in particular, illustrates a lateral audio localization angle (e.g., an azimuth angle). As described above, an observer (e.g., the user 202) can perceive a location of an audio source based on differences in the audio signal at a right ear versus a left ear. The azimuth refers to the angle the audio source makes compared to an imaginary straight line (e.g., axis 204) that is drawn from within the head of the observer through the area between the eyes. Based on the location of the audio source and, thus, the azimuth angle, the audio signal can have different properties (e.g., time-of-arrival, sound-pressure-level) at each of the right ear and the left ear of the observer (e.g., the user 202). Such audio signal differences allow the observer (e.g., the user 202) to localize the audio source. The azimuth angle can be defined to be 0 degrees when the audio source is in line (e.g., directly in front) with the observer (e.g., the user 202). As the audio source moves toward the right of the observer (e.g., the user 202), the azimuth angle increases from 0 degrees up to 90 degrees when the audio source is in line with the right ear of the observer (e.g., the user 202). As the audio source moves toward the left of the observer (e.g., the user 202), the azimuth angle decreases from 0 degrees down to −90 degrees when the audio source is in line with the left ear of the observer (e.g., the user 202).

Figure 2B:
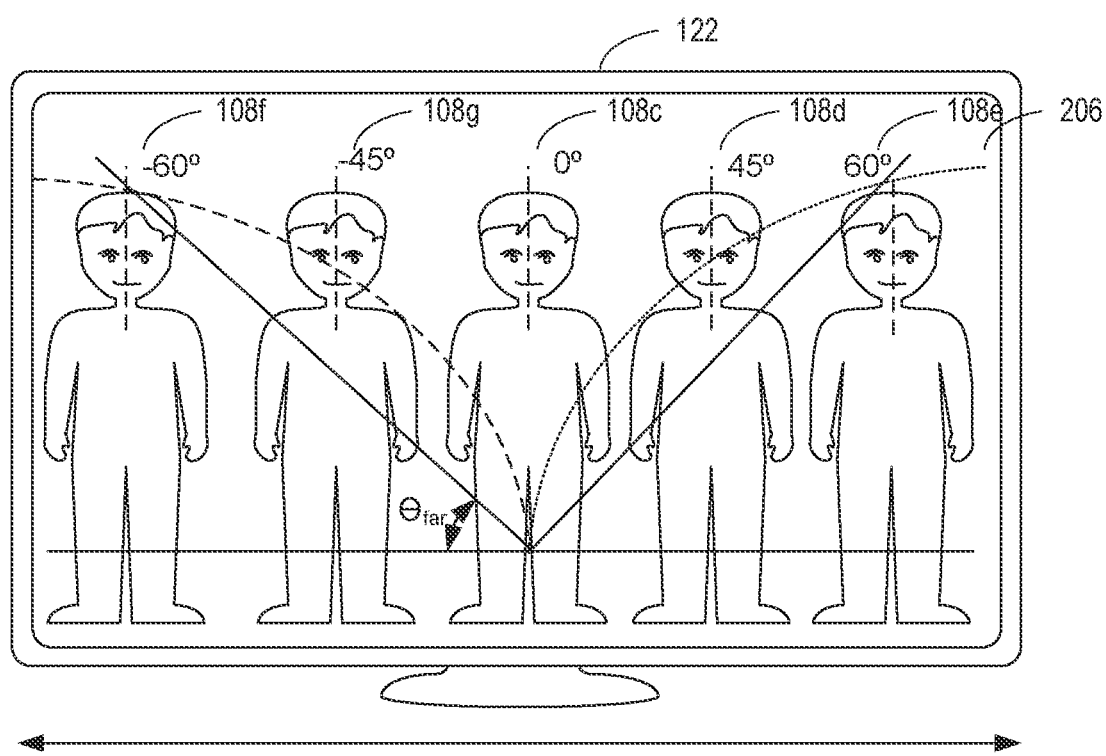
FIG. 2B illustrates the display screen of the example user device and, in particular, illustrates the audio source on the display screen positioned relative to a plurality of lateral audio localization angles corresponding to the audio source.

FIG. 2B illustrates the display screen 122 of the example user device 123 and, in particular, illustrates the audio source on an image 206 displayed on the display screen 122. The image 206 of FIG. 2B corresponds to an image associated with the far plane 120 of FIG. 1. In the example of FIG. 2B, the user 202 (not shown) of the user device 123 views the display screen 122 from a central position. In other words, the axis 204 of the user 202 is aligned with a middle point of the display screen 122 and, thus, a middle point of the image 206. In FIG. 2B, the audio source (e.g., the user 108) is located relative to a plurality of azimuth angles. For example, the user 108c is located at a position corresponding to an azimuth angle of 0 degrees. In other words, the user 108c is aligned with the middle point of the image 206. The users 108d, 108e, 108f, 108g are located at positions corresponding to azimuth angles of 45 degrees, 60 degrees, −45 degrees, and −60 degrees respectively.

Figure 3:
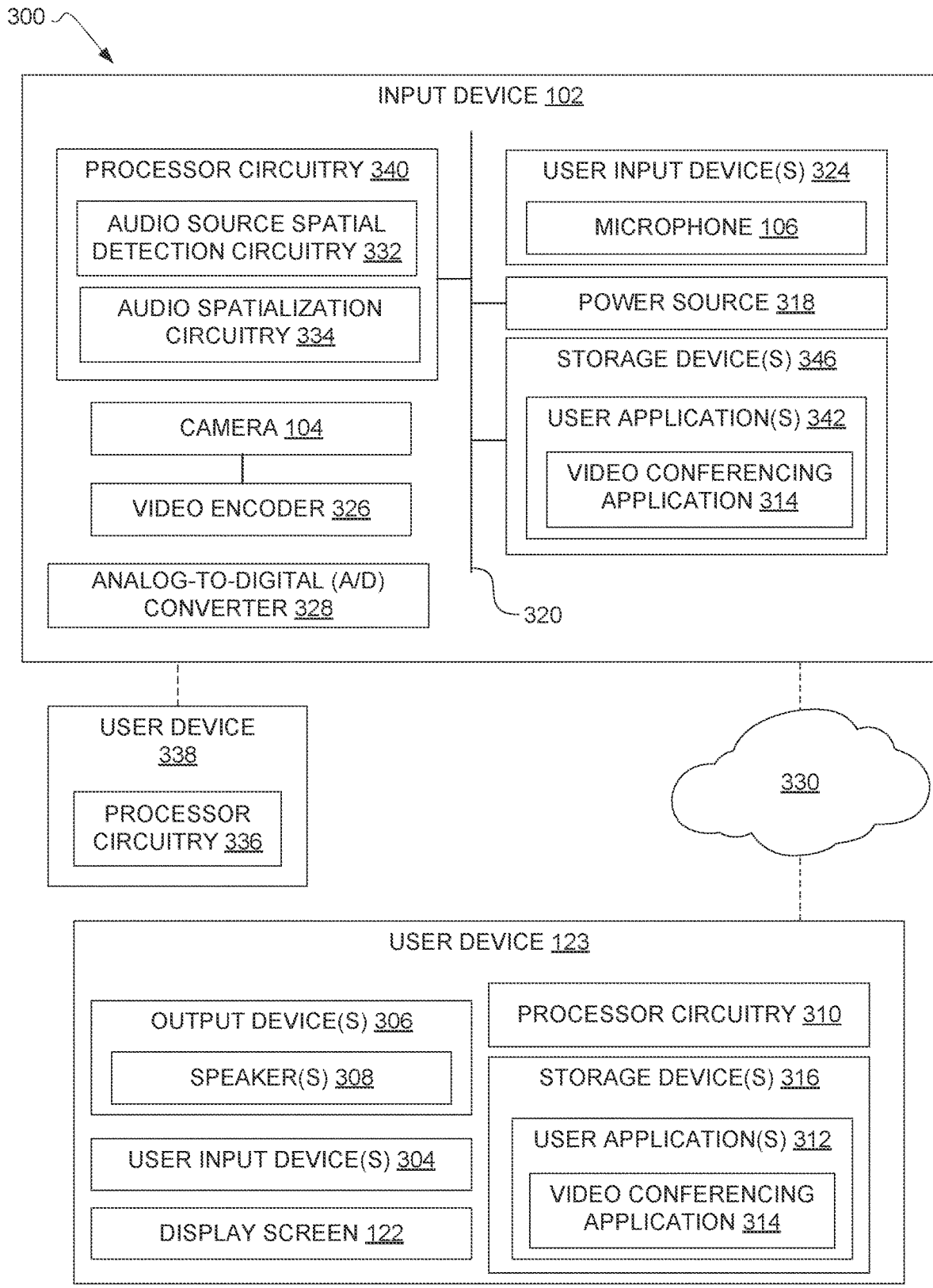
FIG. 3 illustrates an example system constructed in accordance with the teachings of this disclosure including the example user device, the example input device, audio source spatial detection circuitry for detecting a spatial position of an audio source, and audio spatialization circuitry for introducing audio spatialization in response to the audio source spatial detection in accordance with teachings of this disclosure.

FIG. 3 illustrates an example system 300 constructed in accordance with teachings of this disclosure for applying audio spatialization in response to a spatial position of an audio source. The example system 300 of FIG. 3 includes a user device 123 (e.g., the user device 123 of FIGS. 1B-2B). The example user device 123 can be a personal computing device such as a laptop, a desktop computer, an electronic tablet, a smartphone, etc.

The example user device 123 includes the display screen 122. In some examples, the display screen 122 is a touch screen that enables a user (e.g., the user 202 of FIG. 2A) to interact with data presented on the display screen 122 by touching the display screen 122 with a stylus and/or one or more fingers or a hand of the user. Additionally or alternatively, the user can interact with data presented on the display screen 122 via user input device(s) 304 such as a microphone, a keyboard, a mouse, touch pad, etc. The example user device 123 includes one or more output device(s) 306 such as speaker(s) 308 to provide audible outputs to the user of the user device 123.

The example user device 123 of FIG. 3 includes processor circuitry 310. The processor circuitry 310 of the example user device 123 is a semiconductor-based hardware logic device. The hardware processor circuitry 310 may implement a central processing unit (CPU) of the user device 123, may include any number of cores, and may be implemented, for example, by a processing commercially available from Intel® Corporation. The processor circuitry 310 executes machine readable instructions (e.g., software) including, for example, user application(s) 312 such as a video conferencing application 314 installed on the user device 123. The user application(s) 312 are stored in one or more storage devices 316 such as non-volatile memory (e.g., flash memory).

The example system 300 includes an input device 102 (e.g., the input device 102 of FIG. 1A). A user (e.g., the user 108) of the input device 102 can interact with the input device 102 via user input device(s) 324 such as the microphone 106, a keyboard, a mouse, touch pad, etc. The example input device 102 of FIG. 3 includes processor circuitry 340. The processor circuitry 340 of the example input device 102 is a semiconductor-based hardware logic device. The hardware processor circuitry 340 may implement a central processing unit (CPU) of the input device 102, may include any number of cores, and may be implemented, for example, by a processing commercially available from Intel® Corporation. The processor circuitry 340 executes machine readable instructions (e.g., software) including, for example, user application(s) 342 such as a video conferencing application 314 installed on the user device 102. The user application(s) 342 are stored in one or more storage devices 346 such as non-volatile memory (e.g., flash memory). The example input device 102 of FIG. 3 includes a power source 318 such as a battery and/or transformer and AC/DC converter to provide power to the processor circuitry 340 and/or other components of the input device 102 communicatively coupled via a bus 320.

The example input device 102 of FIG. 3 includes the camera 104. The example input device 102 of FIG. 3 includes a video encoder 326 to process image data output by the camera 104. As disclosed in connection with FIGS. 1 and 2, the camera 104 generates image data including the environment of the input device 102 which can include an audio source (e.g., the user 108). Also, the microphone 106 outputs audio signals including audio generated by the audio source. For example, the audio source can be a voice of the user 108 while interacting with the video conferencing application 344. The example input device 102 includes an analog-to-digital (A/D) converter 328 to convert analog signals from the microphone 106 to digital signals.

In the example of FIG. 3, the audio data generated by the microphone 106 and converted by the A/D converter 328 and the image data generated by the camera 104 and processed by the video encoder 326 are transmitted to the example user device 123. The audio data and the image data may be transmitted to the user device 123 via one or more protocol(s) (e.g., voice-over-internet protocol(s) associated with the video conferencing application 344, through a network 330).

In the example of FIG. 3, image data generated by the camera 104 of the input device 102 (e.g., during use of the video conferencing application 314) and processed by the video encoder 326 is analyzed by audio source spatial detection circuitry 332 to determine a spatial location of the audio source (e.g., the user 108) relative to the camera 104 of the input device 102. The example audio source spatial detection circuitry 332 analyzes the image data to detect the audio source (e.g., the face of the user 108) captured in the image data. The image data including the audio source is analyzed by the example audio source spatial detection circuitry 332 to determine a horizontal localization of the audio source (e.g., the user 108). Additionally, the image data including the audio source is analyzed by the example audio source spatial detection circuitry 332 to determine a proximity (e.g., depth) of the audio source (e.g., the user 108) relative to the camera 104. Based on the horizontal location and the proximity of the audio source, the example audio source spatial detection circuitry 332 estimates an azimuth angle corresponding the spatial location of the audio source. The spatial location (e.g., the azimuth angle) can be used to apply audio spatialization to the audio signal including the audio source.

In the example of FIG. 3, the audio source spatial location detected by the audio source spatial detection circuitry 332 is used by audio spatialization circuitry 334. In the example of FIG. 3, the audio spatialization circuitry 334 selects a set of audio filters (e.g., a set of head related transfer function (HRTF) filters) based on the audio source spatial location. The example audio spatialization circuitry 334 can apply the selected filters to a right channel and a left channel of the audio signal output by the microphone 106 (e.g., during use of the video conferencing application 314), thus generating spatial audio corresponding to a spatial location of the audio source. The spatial audio can be output at the speaker(s) 308 of the user device 123.

In the example of FIG. 3, the audio spatialization circuitry 334 is implemented by executable instructions executed on the processor circuitry 340 of the input device 102. However, in other examples, the audio spatialization circuitry 334 is implemented by processor circuitry 336 of another user device 338 (e.g., a smartphone, an edge device, a wearable device, etc.) in communication with the user device 123 (e.g., via wired or wireless communication protocols), by the cloud-based device(s) 330 (e.g., one or more server(s), processor(s), and/or virtual machine(s)) and/or by processor circuitry 310 of the user device 123. In other examples, the audio spatialization circuitry 334 is implemented by dedicated circuitry located on the input device 102, the user device 338 and/or the user device 123. These components may be implemented in software, hardware, or in any combination of two or more of software, firmware, and/or hardware.

In the example of FIG. 3, the audio source spatial detection circuitry 332 is implemented by executable instructions executed on the processor circuitry 340 of the input device 102. However, in other examples, the audio source spatial detection circuitry 332 is implemented by the processor circuitry 336 of the user device 338, by a cloud-based device 330 (e.g., one or more server(s), processor(s), and/or virtual machine(s)) and/or by the processor circuitry 310 of the user device 123. In other examples, the audio source spatial detection circuitry 332 is implemented by dedicated circuitry located on the input device 102, the user device 338, and/or the user device 123. These components may be implemented in software, hardware, or in any combination of two or more of software, firmware, and/or hardware.

Figure 4:
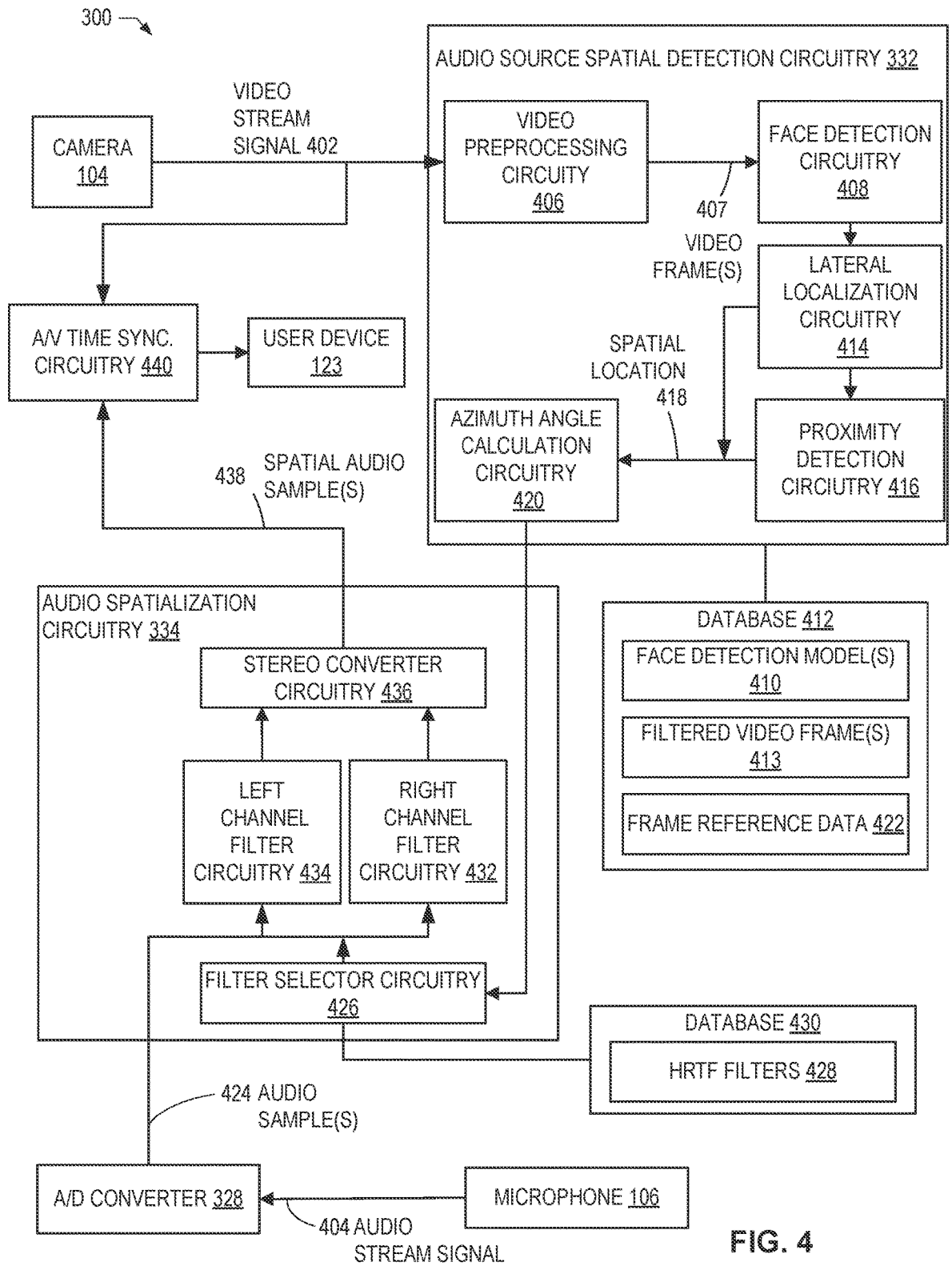
FIG. 4 is a block diagram of example implementation of the audio source spatial detection circuitry of FIG. 3 and an example implementation of the audio spatialization circuitry of FIG. 3.

FIG. 4 is a block diagram of an example implementation of the audio source spatial detection circuitry 332 and the audio spatialization circuitry 334 of FIG. 3. As mentioned above, the audio source spatial detection circuitry 332 is structured to identify (e.g., predict, estimate, recognize) a spatial location of an audio source (e.g., the user 108 of FIGS. 1A, 1B, and/or 2B) relative to a camera (e.g., the camera 104 of the user device 123). As also mentioned above, the audio spatialization circuitry 334 is structured to generate spatial audio applied corresponding an audio source (e.g., the user 108) captured by the microphone 106 of the input device 102.

During a video conference using the input device 102 (e.g., during operation of the video conferencing application 314), the camera 104 (e.g., video camera) generates image data in the form of a video stream or feed signal 402 (e.g., output by the video encoder 326 of FIG. 3). In the example of FIG. 4, the video stream signal 402 is transmitted to the audio source spatial detection circuitry 332 via the network 330 for analysis with respect to spatial location of the audio source (i.e., the user 108) relative to the camera 104. Also, during a video conference, the microphone 106 generates an audio stream signal 404 based on sound captured from the audio source (e.g., the user 108) and/or the environment in which the input device 102 and/or the microphone 106 is located. As disclosed herein, the audio stream signal 404 is sampled and provided to the audio spatialization circuitry 334.

In some examples, the video stream signal 402 is captured at a high resolution (e.g., 1280×720 pixels) and a high frame rate (e.g., 30 frames per second (FPS)) based on, for example, settings associated with the video conferencing application 314 and/or the video encoder 326 of FIG. 3. The example audio source spatial detection circuitry 332 of FIG. 4 includes video preprocessing circuitry 406. In the example of FIG. 4, the video preprocessing circuitry 406 down samples the video stream signal 402 output by the camera 104. For example, the video preprocessing circuitry 406 reduces a sampling rate of the video stream signal 402 from, for instance, 30 frames per second (FPS) to 5 FPS. In some examples, the video preprocessing circuitry 406 reduces or reshapes a resolution of the video stream signal 402. For example, the video preprocessing circuitry 406 can decrease a resolution of the video stream signal 402 (e.g., from 1280×720 pixels to 300×300 pixels). In some examples, the video preprocessing circuitry 406 applies an image filter to the video stream signal 402 to improve lighting conditions. For example, the video preprocessing circuitry 406 can increase a brightness level or increase a contrast level of the video stream signal 402. In some examples, the image filter is applied in response to the video preprocessing circuitry 406 determining the video stream signal 402 includes inadequate lighting for an artificial intelligence-computer vision (AI-CV) algorithm. The down-sampling and/or resolution reduction performed by the video preprocessing circuitry 406 reduces consumption of computing resources during the audio source spatial location analysis without sacrificing accuracy. As a result of the operations of the video preprocessing circuitry 406 (e.g., down sampling, reshaping, and/or image filtering), video preprocessing circuitry 406 generates processed video frame(s) 407.

The example audio source spatial detection circuitry 332 includes face detection circuitry 408. In the example of FIG. 4, the face detection circuitry 408 detects face(s) (i.e., human face(s)) in the video frames 407. In the example of FIG. 4, the face detection circuitry 408 executes one or more neural network model(s) to detect face(s) in the respective video frame(s) 407. In particular, the example face detection circuitry 408 of FIG. 4 executes one or more face detection model(s) 410 to identify face(s) in the video frame(s) 407 and to output bounding boxes at the predicted location(s) of the face(s) in the video frame image data 407. As disclosed in connection with FIG. 5, the face detection model(s) 410 are generated as a result of neural network training.

In the example of FIG. 4, the face detection model(s) 410 are stored in a database 412. In some examples, the audio source spatial detection circuitry 332 includes the database 412. In other examples, the database 412 is located external to the audio source spatial detection circuitry 332 in a location accessible to the audio source spatial detection circuitry 332 as shown in FIG. 4.

As a result of the execution of the face detection model(s) 410, the face detection circuitry 408 detects or identifies face(s) in the respective video frame(s) 407. The example face detection circuitry 408 creates a bounding box defined by a set of coordinates, $\{X_{min}, Y_{min}\}$ and $\{X_{max}, Y_{max}\}$, for one or more predicted face as shown in FIG. 1B. In the example of FIG. 4, an area of a bounding box generated as a result of execution of the face detection model(s) 410 is substantially proportional to a size of the face detected in the video frame 407 and/or a proximity of the face to the camera 104. In some examples, the face detection circuitry 408 detects more than one face (e.g., generates more than one bounding box) within the video frame(s) 407. In these examples, the face detection circuitry 408 down selects one of the faces (e.g., one of the bounding boxes) for further analysis based on a selection criteria (e.g., the size of the bounding box). The video frame(s) 407 including a bounding box corresponding to the audio source are stored in the database 412 as filtered video frame(s) 413.

The example audio source spatial detection circuitry 332 of FIG. 4 includes lateral localization circuitry 414. The example lateral localization circuitry 414 detects a lateral position, $x_{loc}$, of the audio source (e.g., the user 108) within the video frame 407. For example, the lateral localization circuitry 414 can determine the lateral position, $x_{loc}$, of the audio source (e.g., the user 108) based on a center point of the bounding box (e.g., the selected bounding box). For example, the lateral localization circuitry 414 can use Equation 1 below to determine the lateral position, $x_{loc}$, based on the coordinates of the bounding box.

$$x_{loc} = \frac{X_{max} + X_{min}}{2} \quad \text{(Equation 1)}$$

In the example of FIG. 4, the lateral localization circuitry 414 performs a smoothing operation using Equation 2 below. In the below Equation 2, $x'_{smooth\_loc}[n]$ represents a smoothed lateral location value at a time step n, wherein n=0 represents the initial time step. A filtering parameter a is a tunable parameter that may be adjusted between 0 and 1. For instance, the filter parameter can be assigned a value of $\alpha=0.2$ to generate a smooth lateral location value curve. Thus, the example lateral localization circuitry 414 determines smoothed lateral location value(s) based on the video stream signal 402 output by the camera 104.

$$x'_{smooth\_loc}[n] = \alpha x_{loc}[n] + (1-\alpha)x_{loc}[n-1] \quad \text{(Equation 2)}$$

The example audio source spatial detection circuitry 332 of FIG. 4 includes proximity detection circuitry 416. The example proximity detection circuitry 416 determines a proximity of the audio source (e.g., the user 108) to the camera 104. The example proximity detection circuitry 416 can determine the proximity of the audio source (e.g., the user 108) based on the bounding box (e.g., the selected bounding box) and frame reference data 422 stored in the database 412. For example, the frame reference data 422 can include reference data corresponding to properties of the video frame(s) 407 including a width of the video frame, $W_{frame}$. In the example of FIG. 4, the proximity detection circuitry 416 determines the proximity to be one of a plurality of discrete proximities (e.g., near, medium, far, etc.). For example, the proximity detection circuitry 416 can determine a ratio, R, of a width of the bounding box to the width of the video frame(s) 407 using Equation 3 below.

$$R = \frac{X_{max} - X_{min}}{W_{frame}} \quad \text{(Equation 3)}$$

If the ratio, R, is found to be greater than 25 percent, the proximity detection circuitry 416 can determine the proximity of the audio source (e.g., the user 108) is near. If the ratio, R, is found to be between 10 percent and 25 percent, the proximity detection circuitry 416 can determine the proximity of the audio source (e.g., the user 108) is medium. If the ratio, R, is found to be less than 10 percent, the proximity detection circuitry 416 can determine the proximity of the audio source (e.g., the user 108) is far. For example, if the proximity detection circuitry 416 finds the width of the selected bounding box is 5% of the width of the video frame 407, the proximity detection circuitry 416 can determine the proximity of the user 108 is far. The lateral position, $x_{loc}$, determined by the lateral localization circuitry 414 and the proximity of the audio source form a spatial location 418 of the audio source.

The example audio source spatial detection circuitry 332 of FIG. 4 includes azimuth angle calculation circuitry 420. As described above, the azimuth refers to the angle the audio source (e.g., the user 108) makes compared to an imaginary straight line (e.g., axis 204) aligned with the head of an observer (e.g., the user 202). Based on the location of the audio source and, thus, the azimuth angle, the audio signal can have different properties (e.g., time-of-arrival, sound-pressure-level) at each of the right ear and the left ear of the observer (e.g., the user 202). Such audio signal differences allow the observer (e.g., the user 202) to localize the audio source. Therefore, the azimuth angle can correspond to a position of an audio source. The example azimuth angle calculation circuitry 420 determines an azimuth angle based on the spatial location 418 and the frame reference data 422.

The example azimuth angle calculation circuitry 420 determines a depth factor (DF) for use in calculating the azimuth angle based on the proximity of the audio source (e.g., the user 108) and the width of the video frame ($W_{frame}$). For example, if the proximity is far, the azimuth angle calculation circuitry 420 uses Equation 4 below to determine a depth factor (DF). If the proximity is medium, the azimuth angle calculation circuitry 420 uses Equation 5 below to determine the depth factor (DF). If the proximity is near, the azimuth angle calculation circuitry 420 uses Equation 6 below to determine the depth factor (DF).

$$DF = \frac{W_{frame}}{4} \quad \text{(Equation 4)}$$

$$DF = \frac{W_{frame}}{2} \quad \text{(Equation 5)}$$

$$DF = W_{frame} \quad \text{(Equation 6)}$$

The example azimuth angle calculation circuitry 420 determines a displacement of the audio source ($D_A$) using Equations 7-8 below wherein CP represents a central point of the video frame(s) 407.

$$CP = \frac{W_{frame}}{2} \quad \text{(Equation 7)}$$

$$D_A = ABS(CP - x_{loc}) \quad \text{(Equation 8)}$$

The example azimuth angle calculation circuitry 420 determines the azimuth angle using one of Equations 9-11 below. If the lateral position, $x_{loc}$, is less than the central point, CP, (e.g., the audio source is on the left hand side of the display screen 122), the azimuth angle calculation circuitry 420 uses Equation 9 to determine the azimuth angle. If the lateral position, $x_{loc}$, is greater than the central point, CP, (e.g., the audio source is on the right hand side of the display screen 122), the azimuth angle calculation circuitry 420 uses Equation 10 to determine the azimuth angle. If the lateral position, $x_{loc}$, is equal to the central point, CP, (e.g., the audio source is in the center of the display screen 122), the azimuth angle calculation circuitry 420 uses Equation 11 to determine the azimuth angle.

$$\theta_{azimuth} = \tangent^{-1}\left(\frac{DepthFactor}{Displacement_{NosePoint}}\right) - 90 \quad \text{(Equation 9)}$$

$$\theta_{azimuth} = 90 - \tangent^{-1}\left(\frac{DepthFactor}{Displacement_{NosePoint}}\right) \quad \text{(Equation 10)}$$

$$\theta_{azimuth} = 0 \quad \text{(Equation 11)}$$

Thus, the example audio source spatial detection circuitry 332 of FIG. 4 determines audio source spatial location (e.g., azimuth angle) based on the video stream signal 402 output by the camera 104. In the example of FIG. 4, the audio spatialization circuitry 334 applies audio spatialization to the audio stream signal 404. In particular, the audio spatialization circuitry 334 applies audio spatialization based on the audio source spatial location (e.g., azimuth angle) determined by the audio source spatial detection circuitry 332.

In the example of FIG. 4, the A/D converter 328 samples the audio stream signal 404 and generates digital audio samples 424. In the example of FIG. 4, the audio sample(s) 424 are provided to the audio spatialization circuitry 334. The audio spatialization circuitry 334 includes filter selector circuitry 426. The example filter selector circuitry 426 receives the azimuth angle calculated by the azimuth angle calculation circuitry 420 corresponding to a spatial location of the audio source. The filter selector circuitry 426 selects a set of filters (e.g., a right channel filter and a left channel filter) from head related transfer function (HRTF) filters 428 stored in a database 430. The filter selector circuitry 426 selects the filters based on the spatial location (e.g., the azimuth angle) of the audio source determined by the audio source spatial detection circuitry 332.

The audio spatialization circuitry 334 includes right channel filter circuitry 432 and left channel filter circuitry 434. The example right channel filter circuitry 432 applies the right channel filter selected by the filter selector circuitry 426 to the audio sample(s) 424. As a result of applying the right channel filter, the right channel filter circuitry 432 generates right audio sample(s). The example left channel filter circuitry 434 applies the left channel filter selected by the filter selector circuitry 426 to the audio sample(s) 424. As a result of applying the left channel filter, the left channel filter circuitry 434 generates left audio sample(s). In examples disclosed herein, the right channel filter and the left channel filter are HRTF filters. The example audio spatialization circuitry 334 of FIG. 4 includes stereo converter circuitry 436. The example stereo convertor circuitry 436 combines the right audio sample(s) and the left audio sample(s) to generate spatial audio sample(s) 438.

The spatial audio sample(s) 438 output by the stereo converter circuitry 436 are transmitted to audio and video (A/V) time synchronization circuitry 440 of the input device 102. The A/V time synchronization circuitry 440 also receives the video stream signal 402 output by the video encoder 326 of FIG. 3. The A/V time synchronization circuitry 440 performs time synchronization of the spatial audio sample(s) 438 and the video stream signal 402. For example, the spatial audio sample(s) 438 and the video stream signal 402 can include time stamp data corresponding to a time at which the audio or video was captured. The A/V time synchronization circuitry 440 matches the time stamp(s) of the spatial audio sample(s) 438 to the time stamp(s) of the video stream signal 402 to create a time synchronized audio and video stream. The A/V time synchronization circuitry 440 outputs data including synchronized video data and spatial audio data to the user device 123. For example, the time synchronized spatial audio is output to the speaker(s) 308 and the time synchronized video data is output to the display screen 122.

During a video conference (e.g., during operation of the video conferencing application 314), the camera 104 of the user device 123 generates the video stream signal 402 over time and the microphone 106 generates the audio stream signal 404 over time. The audio source spatial detection circuitry 332 analyzes new video data in the video stream signal 402 to determine if there have been any changes with respect to the spatial location of the audio source (e.g., the user 108). The audio spatialization circuitry 334 of FIGS. 3 and/or 4 dynamically responds to changes in audio source spatial location by selecting a different set of HRTF filters in view of the audio source spatial location (e.g., azimuth angle) received from the audio source spatial detection circuitry 332 over time. As a result, the example system 300 of FIGS. 3 and/or 4 provides for spatial audio based on the spatial location of the audio source (e.g., the user 108) despite changes in the spatial location of the audio source.

Figure 5:
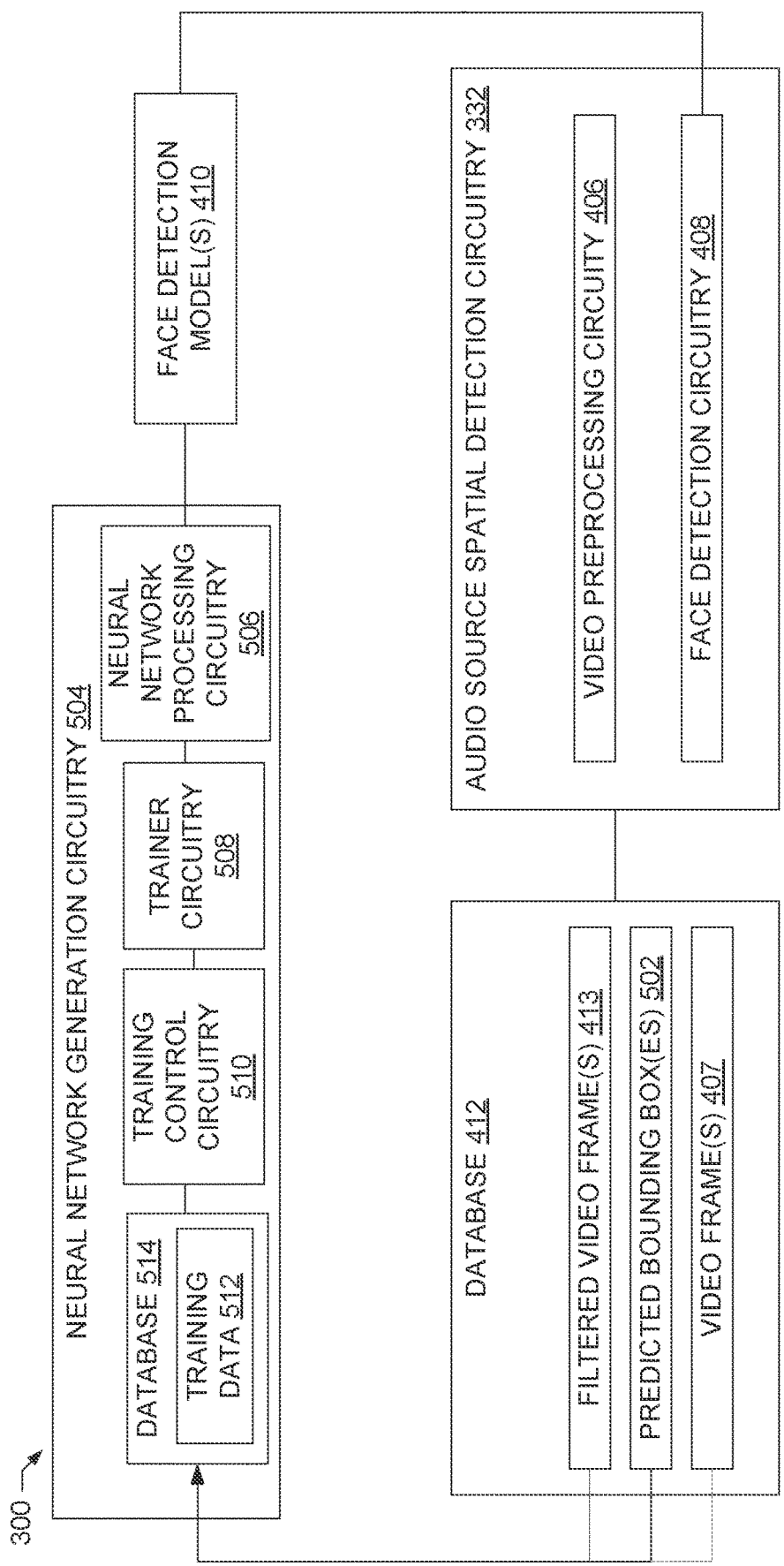
FIG. 5 is a block diagram of neural network generation circuitry for training neural network(s) to generate neural network model(s) for use by the example audio source spatial detection circuitry of FIGS. 3 and/or 4 during analysis of video frames in accordance with teachings of this disclosure.

FIG. 5 is a block diagram of an example implementation of a computing system for generating the neural network model used by the example audio source spatial detection circuitry 332 of FIGS. 3 and/or 4 to identify faces in the video frame(s) 407.

As disclosed in connection with FIG. 4, the face detection circuitry 408 analyzes the video frame(s) 407 to identify face(s) in the image data associated with the video frame(s) 407. In examples disclosed herein, machine learning is used to improve efficiency of the face detection circuitry 408 in detecting human faces in the video frames 407.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model such as a VGGNet based Face Detection and Face Point detection neural network is used. In general, machine learning models/architectures that are suitable to use in the example approaches disclosed herein will be CNN based neural networks (e.g., CNN-based VGGNet neural networks). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In other examples, pre-trained model(s) are used. In some examples re-training may be performed. Such re-training may be performed in response to, for example, poor face detection due to, for instance, low ambient lighting.

Training is performed using training data. In examples disclosed herein, the training data originates from previously collected image data of users including user faces, previously generated bounding boxes, image data including particular facial features such as eyes, nose, etc. Because supervised training is used, the training data is labeled. In some examples, the training data is pre-processed to provide for light balancing in the image data, image rotation, etc.

Once training is complete, the model is deployed for use as an executable construct that processes an input and provides an output based on the network of nodes and connections defined in the model. The model(s) are stored at one or more databases (e.g., the database 412 of FIG. 4). The model may then be executed by the face detection circuitry 408 of the example audio source spatial detection circuitry 332 of FIG. 4.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 5, the example system 300 includes neural network generation circuitry 504 to train a neural network to detect human faces in image data. The example neural network generation circuitry 504 includes neural network processing circuitry 506. In examples disclosed herein, the neural network processing circuitry 506 implements a neural network.

The example neural network generation circuitry 504 of FIG. 5 includes neural network trainer circuitry 508. The example neural network trainer circuitry 508 of FIG. 5 performs training of the neural network implemented by the neural network processing circuitry 506.

The example neural network generation circuitry 504 of FIG. 5 includes training control circuitry 510. The example training control circuitry 510 instructs the neural network trainer circuitry 508 to perform training of the neural network based on training data 512. In the example of FIG. 5, the training data 512 used by the neural network trainer circuitry 508 to train the neural network is stored in a database 514.

In the example of FIG. 5, the training data 512 can include previously generated image data including human faces. The previously generated image data can be collected by the camera 104 associated with the user device(s) 102, 123 and/or different user devices. In some examples, previously generated video frame(s) 407 extracted from the video stream signal 402 by the video preprocessing circuitry 406 are used as the training data 512.

The neural network trainer circuitry 508 trains the neural network implemented by the neural network processing circuitry 506 using the training data 512 to detect human faces in image data. One or more face detection model(s) 410 are generated as a result of the neural network training. The face detection model(s) 410 are stored in the database 412. In other examples, the face detection model(s) 410 can be stored in a different database. The databases 412, 514 may be the same storage device or different storage devices.

The face detection circuitry 408 of the example audio source spatial detection circuitry 332 of FIG. 4 executes the face detection model(s) 410. In particular, the face detection circuitry 408 executes the face detection model(s) 410 for each video frame 407. As a result of the execution of the face detection model(s) 410, the face detection circuitry 408 outputs bounding box(es) 502 corresponding to detected face(s) in the respective video frames 407. The predicted bounding boxes 502 are stored in the database 412. In some examples, the predicted bounding box(es) 502, the video frames 407, and/or the filtered video frame(s) 413 are used as the training data 512 to refine the face detection model(s) 410.

In some examples, the apparatus includes means for determining a position of an audio source. For example, the means for determining may be implemented by audio source spatial detection circuitry 332. In some examples, the audio source spatial detection circuitry 332 may be implemented by machine executable instructions such as that implemented by at least blocks 602, 604, 606, 608, 610, 612 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the audio source spatial detection circuitry 332 is implemented by other hardware logic circuitry, hardware implemented state machines, and/or any other combination of hardware, software, and/or firmware. For example, the audio source spatial detection circuitry 332 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for applying an audio spatialization filter. For example, the means for applying may be implemented by audio spatialization circuitry 334. In some examples, the audio spatialization circuitry 334 may be implemented by machine executable instructions such as that implemented by at least block 614 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the audio spatialization circuitry 334 is implemented by other hardware logic circuitry, hardware implemented state machines, and/or any other combination of hardware, software, and/or firmware. For example, the audio spatialization circuitry 334 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for determining the position of the audio source as an azimuth angle. For example, the means for determining may be implemented by azimuth angle calculation circuitry 420. In some examples, the azimuth angle calculation circuitry 420 may be implemented by machine executable instructions such as that implemented by at least block 612 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the azimuth angle calculation circuitry 420 is implemented by other hardware logic circuitry, hardware implemented state machines, and/or any other combination of hardware, software, and/or firmware. For example, the azimuth angle calculation circuitry 420 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for detecting a face. For example, the means for detecting may be implemented by face detection circuitry 408. In some examples, the face detection circuitry 408 may be implemented by machine executable instructions such as that implemented by at least block 606 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the face detection circuitry 408 is implemented by other hardware logic circuitry, hardware implemented state machines, and/or any other combination of hardware, software, and/or firmware. For example, the face detection circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for generating a bounding box. For example, the means for generating may be implemented by face detection circuitry 408. In some examples, the face detection circuitry 408 may be implemented by machine executable instructions such as that implemented by at least block 606 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the face detection circuitry 408 is implemented by other hardware logic circuitry, hardware implemented state machines, and/or any other combination of hardware, software, and/or firmware. For example, the face detection circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for determining a lateral location of an audio source. For example, the means for determining may be implemented by lateral localization circuitry 414. In some examples, the lateral localization circuitry 414 may be implemented by machine executable instructions such as that implemented by at least block 608 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the lateral localization circuitry 414 is implemented by other hardware logic circuitry, hardware implemented state machines, and/or any other combination of hardware, software, and/or firmware. For example, the lateral localization circuitry 414 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the apparatus includes means for determining a proximity of an audio source. For example, the means for determining may be implemented by proximity detection circuitry 416. In some examples, the proximity detection circuitry 416 may be implemented by machine executable instructions such as that implemented by at least block 610 of FIG. 6 executed by processor circuitry, which may be implemented by the example processor circuitry 712 of FIG. 7, the example processor circuitry 800 of FIG. 8, and/or the example Field Programmable Gate Array (FPGA) circuitry 900 of FIG. 9. In other examples, the proximity detection circuitry 416 is implemented by other hardware logic circuitry, hardware implemented state machines, and/or any other combination of hardware, software, and/or firmware. For example, the proximity detection circuitry 416 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the audio source spatial detection circuitry 332 of FIG. 3 is illustrated in FIG. 4, one or more of the elements, processes, and/or devices illustrated in FIG. 4 may be combined, divided, re-arranged, omitted, eliminated, and/or implemented in any other way. Further, the example video preprocessing circuitry 406, the example face detection circuitry 408, the example lateral localization circuitry 414, the example proximity detection circuitry 416, the example azimuth angle calculation circuitry 420, and/or, more generally, the example audio source spatial detection circuitry 332 of FIG. 3, may be implemented by hardware, software, firmware, and/or any combination of hardware, software, and/or firmware. Thus, for example, any of the example video preprocessing circuitry 406, the example face detection circuitry 408, the example lateral localization circuitry 414, the example proximity detection circuitry 416, the example azimuth angle calculation circuitry 420, and/or, more generally, the example audio source spatial detection circuitry 332, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example video preprocessing circuitry 406, the example face detection circuitry 408, the example lateral localization circuitry 414, the example proximity detection circuitry 416, the example azimuth angle calculation circuitry 420 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audio source spatial detection circuitry 332 of FIG. 3 may include one or more elements, processes, and/or devices in addition to, or instead of, those illustrated in FIG. 4, and/or may include more than one of any or all of the illustrated elements, processes and devices.

While an example manner of implementing the audio spatialization circuitry 334 of FIG. 3 is illustrated in FIG. 4, one or more of the elements, processes, and/or devices illustrated in FIG. 4 may be combined, divided, re-arranged, omitted, eliminated, and/or implemented in any other way. Further, the example filter selector circuitry 426, the example right channel filter circuitry 432, the example left channel filter circuitry 434, the example stereo converter circuitry 436, and/or, more generally, the example audio spatialization circuitry 334 of FIG. 3, may be implemented by hardware, software, firmware, and/or any combination of hardware, software, and/or firmware. Thus, for example, any of the example filter selector circuitry 426, the example right channel filter circuitry 432, the example left channel filter circuitry 434, the example stereo converter circuitry 436, and/or, more generally, the example audio spatialization circuitry 334, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example filter selector circuitry 426, the example right channel filter circuitry 432, the example left channel filter circuitry 434, the example stereo converter circuitry 436 is/are hereby expressly defined to include a non-transitory computer readable storage device or storage disk such as a memory, a digital versatile disk (DVD), a compact disk (CD), a Blu-ray disk, etc., including the software and/or firmware. Further still, the example audio spatialization circuitry 334 of FIG. 3 may include one or more elements, processes, and/or devices in addition to, or instead of, those illustrated in FIG. 4, and/or may include more than one of any or all of the illustrated elements, processes and devices.

While an example manner of implementing the neural network generation circuitry 504 is illustrated in FIG. 5, one or more of the elements, processes, and/or devices illustrated in FIG. 5 may be combined, divided, re-arranged, omitted, eliminated, and/or implemented in any other way. Further, the example training control circuitry 510, the example trainer circuitry 508, the example neural network processing circuitry 506, and/or, more generally, the example neural network generation circuitry of FIG. 5, may be implemented by hardware, software, firmware, and/or any combination of hardware, software, and/or firmware. Thus, for example, any of the example training control circuitry 510, the example trainer circuitry 508, the example neural network processing circuitry 506, and/or, more generally, the example neural network generation circuitry 504, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example training control circuitry 510, the example trainer circuitry 508, the example neural network processing circuitry 506 is/are hereby expressly defined to include a non-transitory computer readable storage device or storage disk such as a memory, a digital versatile disk (DVD), a compact disk (CD), a Blu-ray disk, etc., including the software and/or firmware. Further still, the example neural network generation circuitry 504 of FIG. 5 may include one or more elements, processes, and/or devices in addition to, or instead of, those illustrated in FIG. 5, and/or may include more than one of any or all of the illustrated elements, processes and devices.

Figure 6:
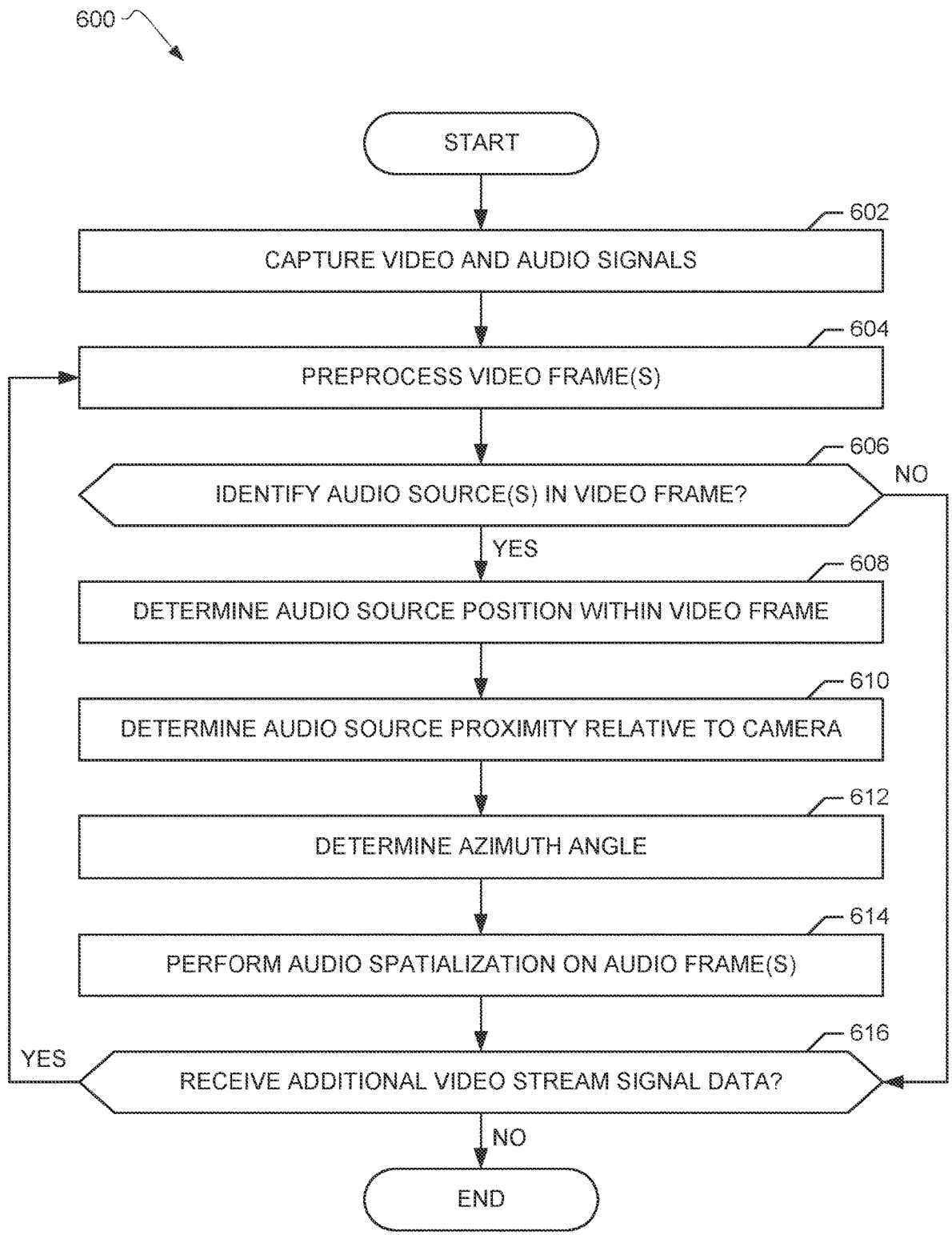
FIG. 6 is a flowchart representative of example machine readable instructions that may be executed by example processor circuitry to implement the audio source spatial detection circuitry of FIGS. 3 and/or 4 and the audio spatialization circuitry of FIGS. 3 and/or 4.

A flowchart representative of example hardware logic circuitry, machine readable instructions, hardware implemented state machines, and/or any combination thereof for implementing the audio source spatial detection circuitry 332 and/or the audio spatialization circuitry 334 of FIGS. 3 and/or 4 is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example audio source spatial detection circuitry 332 and/or the example audio spatialization circuitry 334 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to generate spatial audio based on a location of an audio source in an image. In the example of FIG. 6, the audio source is the user 108 of the input device 102. The machine readable instructions and/or operations 600 of FIG. 6 begin at block 602, at which the input device 102 captures video signals and audio signals associated with the environment of the input device 102. For example, the microphone 106 of the input device 102 captures the audio stream signal 404 and the camera 104 of the input device 102 captures the video stream signal 402. At block 604, the video preprocessing circuitry 406 of the audio source spatial detection circuitry 332 preprocesses the video stream signal 402. For example, the video preprocessing circuitry 406 can down sample (e.g., reduce a frame rate), reshape (e.g., change a size and/or resolution), and/or apply an image filter (e.g., to reduce glare) to the video stream signal 402 to generate the video frame(s) 407.

At block 606, the face detection circuitry 408 analyzes the video frame(s) 407 to identify the presence of audio source(s) (e.g., the user 108) in the video frame(s) 407. For example, the face detection circuitry 408 applies the face detection model(s) 410 to the video frame(s) 407. If the face detection circuitry 408 does not detect any face(s) in the video frame(s) 407 (block 606: NO), control passes to block 616, thus bypassing the audio spatialization process. If the face detection circuitry 408 does detect face(s) in the video frame(s) 407 (block 606: YES), the face detection model(s) 410 generates bounding boxes corresponding to the face(s). In some examples, the face detection circuitry 408 detects more than one face in the video frame(s) 407. In this example, a bounding box corresponding to a face is selected based on a selection criteria (e.g., a size of the bounding box). At block 608, the lateral localization circuitry 414 determines a lateral position of the audio source (e.g., the user 108) within the video frame 407. For example, the lateral localization circuitry 414 can determine a central point of the bounding box (e.g., the selected bounding box) by finding an average of the $X_{min}$ and the $X_{max}$ values of the bounding box as shown in FIG. 1B.

At block 610, the proximity detection circuitry 416 determines a proximity of the audio source (e.g., the user 108) from the camera 104. The proximity of the audio source (e.g., the user 108) can be based on a relative width of the bounding box (e.g., the selected bounding box) compared to a width of the video frame 407. In some examples, the proximity detection circuitry determines the proximity to be one of a plurality of discrete proximities (e.g., near, medium, far, etc.). For example, the proximity detection circuitry 416 can determine the width of the selected bounding box is 5% of the width of the video frame 407. In this example, the proximity detection circuitry 416 determines that the proximity of the audio source is far. The lateral position and the proximity of the audio source form a spatial location of the audio source.

At block 612, the azimuth angle calculation circuitry 420 determines an azimuth viewing angle of the audio source relative to an observer (e.g., the user 202 of the user device 123) based on the spatial location of the audio source and reference data of the video frame(s) 407. For example, if the proximity of the audio source is far, the azimuth angle calculation circuitry 420 can use Equations 4-11 to calculate the azimuth angle of the audio source. If the proximity determined by the proximity detection circuitry 416 is far and the frame width, $W_{frame}$, is 300 pixels, the azimuth angle calculation circuitry 420 uses Equation 4 to determine that the depth factor, DF, is 75(300/4). Additionally, the azimuth angle calculation circuitry 420 can use Equation 7 to calculate a central point, CP, of 150 pixels (300/2). If the lateral position, $x_{loc}$, determined by the lateral localization circuitry 414 is 210, the azimuth angle calculation circuitry 420 can use Equation 8 to calculate a displacement of the audio source, $D_A$, of 60 pixels (ABS(210−150)). In this example, because the lateral position, $x_{loc}$, is greater than the central point, CP, the azimuth angle calculation circuitry 420 uses Equation 10 to calculate the azimuth angle. For example, the azimuth angle determined by the azimuth angle calculation circuitry 420 is 39 degrees (90−tangent$^{-1}$(75/60)).

At block 614, the audio spatialization circuitry 334 performs audio spatialization on the audio samples(s) 424. For example, the filter selector circuitry 426 selects a set of filters (e.g., a right HRTF filter and a left HRTF filter) from the HRTF filters 428 corresponding to the azimuth angle (e.g. 39 degrees). The right channel filter circuitry 432 can apply the right HRTF filter to the audio sample(s) 424 to generate right audio sample(s) and the left channel filter circuitry 434 can apply the left HRTF filter to the audio sample(s) 424 to generate left audio sample(s). Subsequently, the stereo converter circuitry 436 can generate the spatial audio sample(s) 438 by combining the right audio sample(s) and the left audio sample(s). At block 616, the audio source spatial detection circuitry 332 determines if additional video stream signal data has been received. If additional video stream signal data has been received (block 616: YES), the process returns to block 604. If no additional video stream signal data has been received (block 616: NO), the process ends.

Figure 7:
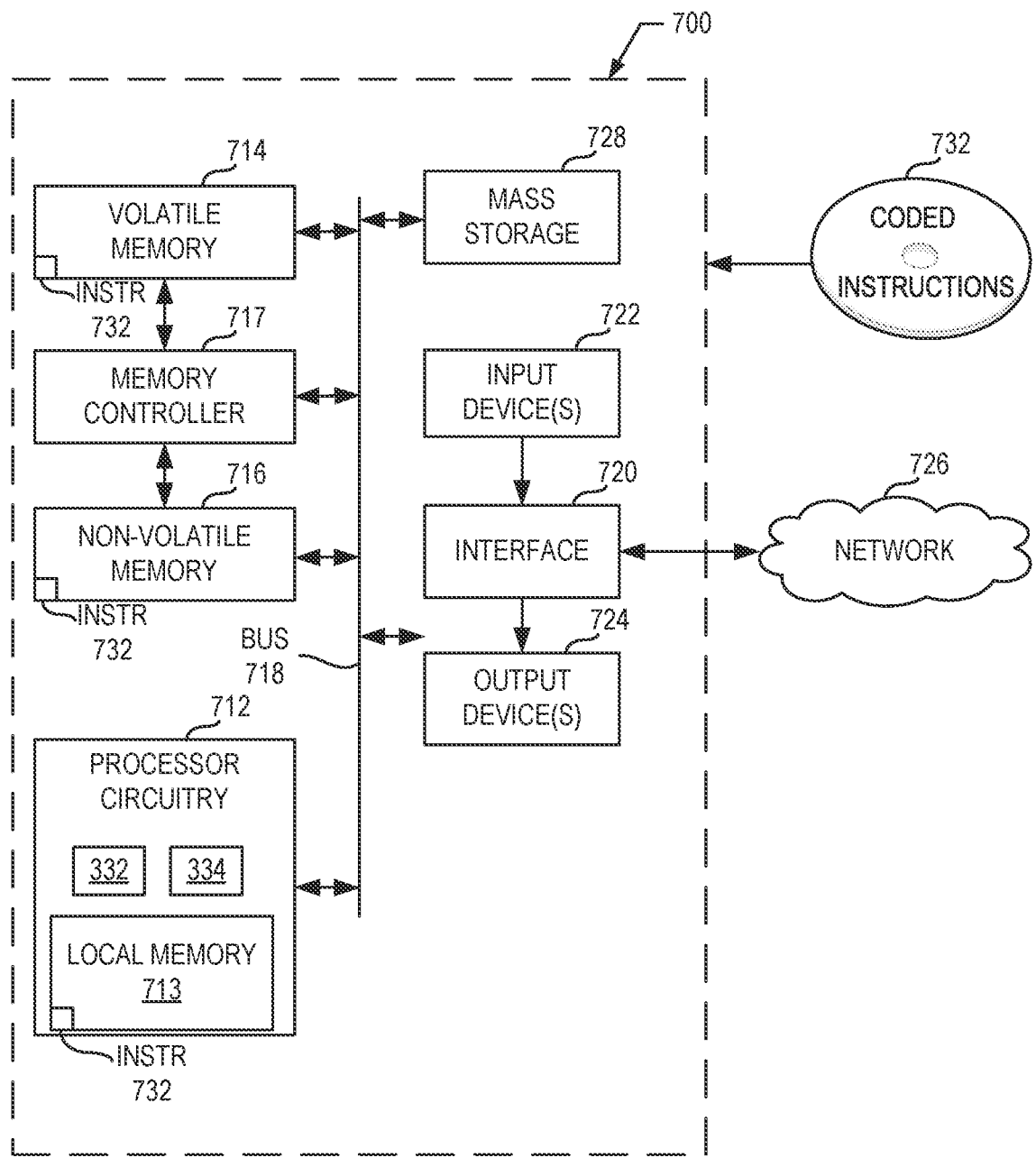
FIG. 7 is a block diagram of an example processing platform including processor circuitry structured to execute the example machine readable instructions of FIG. 6 to implement the audio source spatial detection circuitry of FIGS. 3 and/or 4 and the audio spatialization circuitry of FIGS. 3 and/or 4.

FIG. 7 is a block diagram of an example processor platform 700 structured to execute and/or instantiate the machine readable instructions and/or operations of FIG. 6 to implement the audio source spatial detection circuitry 332 of FIGS. 3 and/or 4 and the audio spatialization circuitry 334 of FIGS. 3 and/or 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the audio source spatial detection circuitry 332 and the audio spatialization circuitry 334.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIG. 6, may be stored in the mass storage device 728, in the volatile memory 714, in the non-volatile memory 716, and/or on a removable non-transitory computer readable storage medium such as a CD or DVD.

Figure 8:
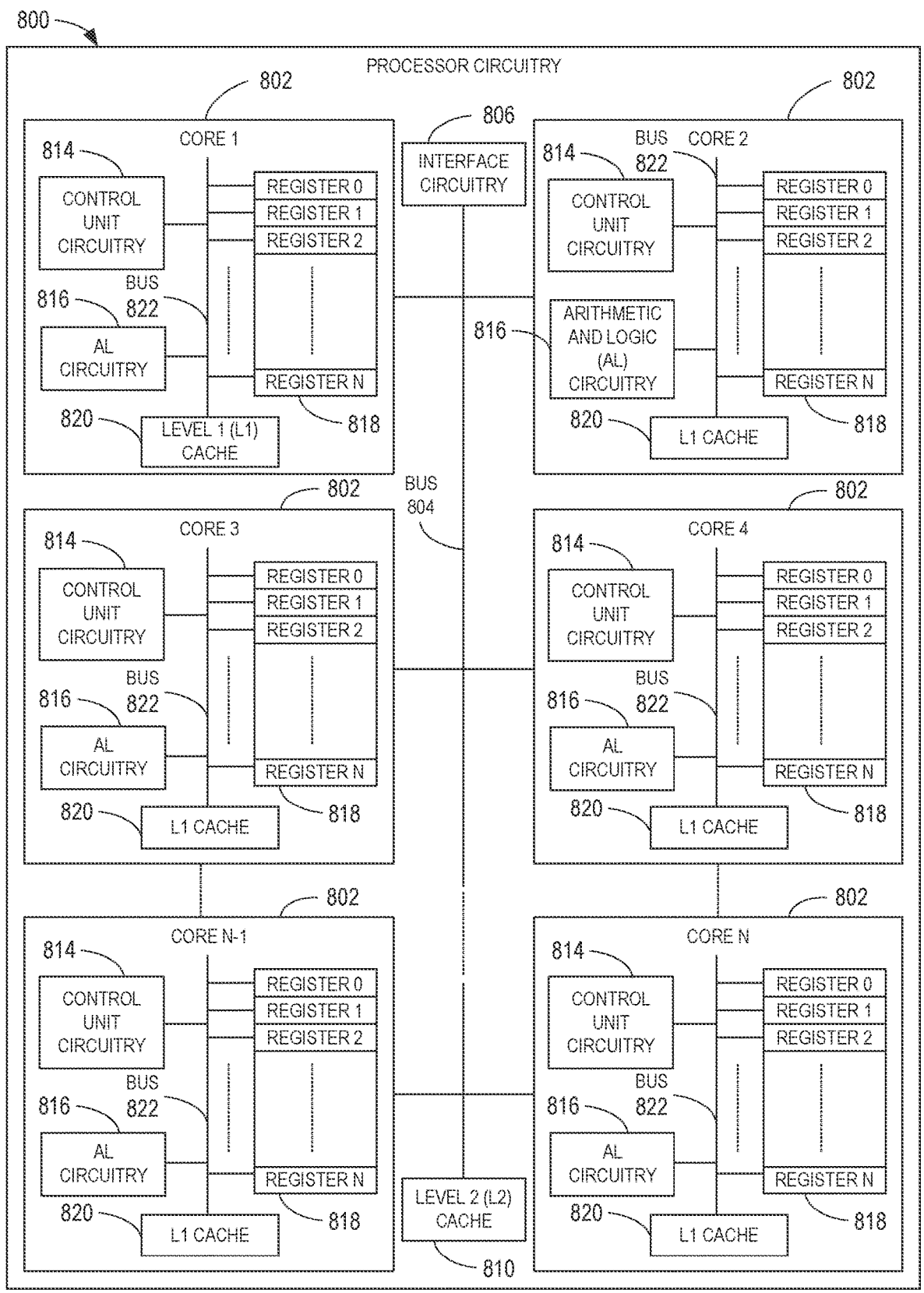
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may implement multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 822 may implement at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
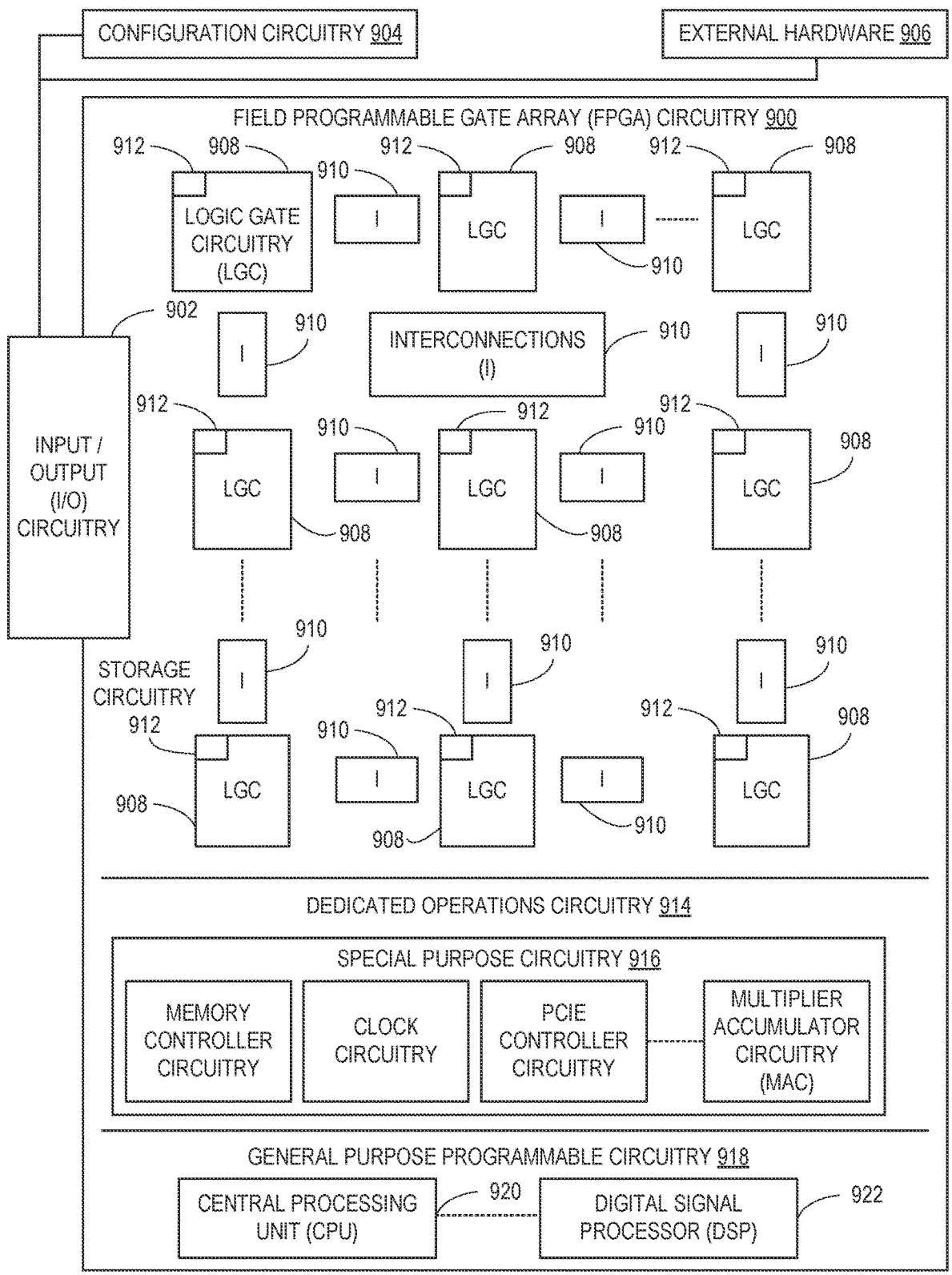
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowchart of FIG. 6. In particular, the FPGA 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may implement the microprocessor 800 of FIG. 8. The FPGA circuitry 900 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8 and a second portion of the machine readable instructions represented by the flowchart of FIG. 6 may be executed by the FPGA circuitry 900 of FIG. 9.

In some examples, the processor circuitry 712 of FIG. 7 may be in one or more packages. For example, the processor circuitry 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
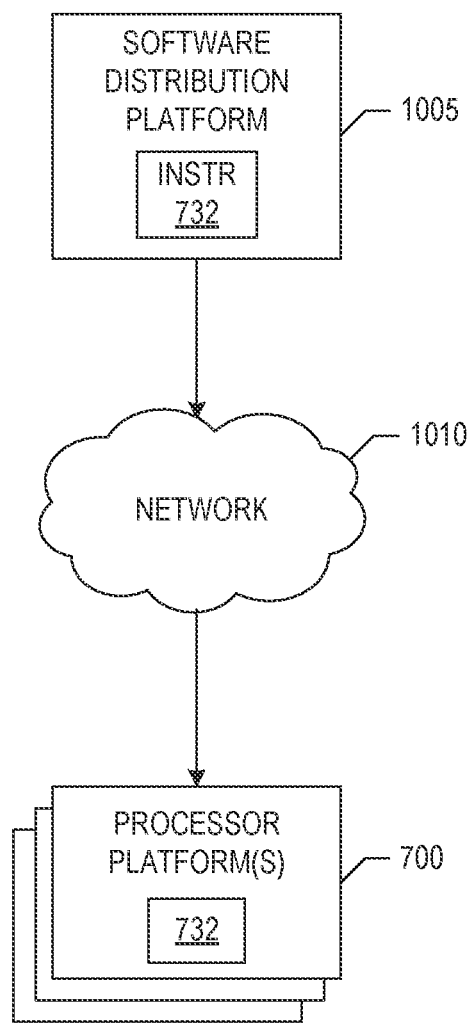
FIG. 10 is a block diagram of an example software distribution platform (e.g., one or more servers) to distribute software (e.g., software corresponding to the example machine readable instructions of FIG. 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 600 of FIG. 6, as described above. The one or more servers of the example software distribution platform 1005 are in communication with a network 1010, which may correspond to any one or more of the Internet and/or any of the example networks 330, 726 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 600 of FIG. 6, may be downloaded to the example processor platform 400, which is to execute the machine readable instructions 732 to implement the audio source spatial detection circuitry 332 and the audio spatialization circuitry 334. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that provide for spatialization of audio based on a location of an audio source determined based on an image. The disclosed systems, methods, apparatus, and articles of manufacture improve the efficiency of using a computing device by using image data generated as part of a video conference to determine audio source location, rather than using separate proximity and location sensors or other hardware. The disclosed systems, methods, apparatus, and articles of manufacture are accordingly directed to one or more improvement(s) in the operation of a machine such as a computer or other electronic and/or mechanical device.

Example apparatus, systems, and methods for generating spatial audio based on computer vision are disclosed herein. Further examples and combinations thereof include the following:

Example 1 includes an apparatus including at least one memory, instructions in the apparatus, and processor circuitry to execute the instructions to determine a position of an audio source based on an image generated via a camera, and apply an audio spatialization filter to an audio signal generated by a microphone based on the position of the audio source.

Example 2 includes the apparatus of example 1, wherein the processor circuitry is to determine the position of the audio source as an azimuth angle.

Example 3 includes the apparatus of example 1, wherein the audio source is a person speaking.

Example 4 includes the apparatus of example 3, wherein the processor circuitry is to detect a face of the person speaking in the image, and generate a bounding box of the face of the person speaking in the image.

Example 5 includes the apparatus of example 4, wherein the processor circuitry is to determine a lateral location within the image of the person speaking based on a location of the bounding box, and determine a proximity of the person speaking with respect to the camera based on a size of the bounding box.

Example 6 includes the apparatus of example 5, wherein the processor circuitry is to determine the position of the person speaking based on the lateral location and the proximity.

Example 7 includes the apparatus of example 5, wherein the processor circuitry is to determine the proximity of the person speaking to be on a near plane, a medium plane, or a far plane.

Example 8 includes the apparatus of example 1, wherein the microphone is located at the audio source.

Example 9 includes the apparatus of example 1, wherein the audio spatialization filter is a head related transfer function.

Example 10 includes the apparatus of example 1, wherein the audio spatialization filter includes a left channel filter and a right channel filter.

Example 11 includes at least one non-transitory computer readable storage medium comprising instructions that, when executed, cause processor circuitry to at least determine a position of an audio source based on an image generated via a camera, and apply an audio spatialization filter to an audio signal generated by a microphone based on the position of the audio source.

Example 12 includes the at least one non-transitory computer readable storage medium of example 11, wherein the instructions are to cause the processor circuitry to determine the position of the audio source as an azimuth angle.

Example 13 includes the at least one non-transitory computer readable storage medium of example 11, wherein the audio source is a person speaking.

Example 14 includes the at least one non-transitory computer readable storage medium of example 13, wherein the instructions are to cause the processor circuitry to detect a face of the person speaking in the image, and generate a bounding box of the face of the person speaking in the image.

Example 15 includes the at least one non-transitory computer readable storage medium of example 14, wherein the instructions are to cause the processor circuitry to determine a lateral location within the image of the person speaking based on a location of the bounding box, and determine a proximity of the person speaking with respect to the camera based on a size of the bounding box.

Example 16 includes the at least one non-transitory computer readable storage medium of example 15, wherein the instructions are to cause the processor circuitry to determine the position of the person speaking based on the lateral location and the proximity.

Example 17 includes the at least one non-transitory computer readable storage medium of example 15, wherein the instructions are to cause the processor circuitry to determine the proximity of the person speaking to be on a near plane, a medium plane, or a far plane.

Example 18 includes the at least one non-transitory computer readable storage medium of example 11, wherein the audio spatialization filter is a head related transfer function.

Example 19 includes the at least one non-transitory computer readable storage medium of example 11, wherein the audio spatialization filter includes a left channel filter and a right channel filter.

Example 20 includes a method comprising determining a position of an audio source based on an image generated via a camera, and applying an audio spatialization filter to an audio signal generated by a microphone based on the position of the audio source.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions; and
   at least one processor circuit to execute the machine-readable instructions to:
      determine a spatial location of an audio source relative to a camera based on a lateral position of the audio source in an image frame generated via the camera and a depth factor, the depth factor based on a width of the image frame;
      generate a left audio sample and a right audio sample by applying, based on the spatial location of the audio source, an audio spatialization filter to a single-channel audio signal generated by a microphone, the single-channel audio signal associated with the audio source; and
      combine the left audio sample and the right audio sample to generate a spatial audio sample corresponding to the spatial location of the audio source.

2. The apparatus of claim 1, wherein one or more of the at least one processor circuit is to determine the spatial location of the audio source as an azimuth angle.

3. The apparatus of claim 1, wherein the audio source is a person speaking and wherein one or more of the at least one processor circuit is to:
   detect a face of the person speaking in the image frame; and
   generate a bounding box of the face of the person speaking in the image frame.

4. The apparatus of claim 3, wherein one or more of the at least one processor circuit is to:
   determine the lateral position within the image frame of the person speaking based on a location of the bounding box; and
   determine a proximity of the person speaking with respect to the camera based on a size of the bounding box.

5. The apparatus of claim 4, wherein one or more of the at least one processor circuit is to determine the depth factor based on the proximity.

6. The apparatus of claim 4, wherein one or more of the at least one processor circuit is to determine the proximity of the person speaking to be on a near plane, a medium plane, or a far plane, the near plane located a first distance from the camera, the medium plane located a second distance from the camera, and the far plane located a third distance from the camera, the second distance greater than the first distance and less than the third distance, the third distance greater than the first distance and the second distance.

7. The apparatus of claim 6, wherein one or more of the at least one processor circuit is to:
   determine a ratio of a width of the bounding box to a width of the image frame; and
   perform a comparison of the ratio relative to a threshold; and
   determine the proximity of the person speaking to be on the near plane, the medium plane, or the far plane based on the comparison.

8. The apparatus of claim 4, wherein one or more of the at least one processor circuit is to determine the proximity based on the size of the bounding box and the width of the image frame.

9. The apparatus of claim 1, wherein the audio spatialization filter is a head related transfer function.

10. The apparatus of claim 1, wherein the audio spatialization filter includes a left channel filter and a right channel filter.

11. The apparatus of claim 10, wherein one or more of the at least one processor circuit is to:
generate the left audio sample by applying the left channel filter to the single-channel audio signal; and
generate the right audio sample by applying the right channel filter to the single-channel audio signal.

12. The apparatus of the claim 1, wherein one or more of the at least one processor circuit is to determine the spatial location based on a distance of the lateral position from a center point of the image frame.

13. At least one non-transitory machine-readable storage medium comprising machine-readable instructions to cause at least one processor circuit to at least:
determine a spatial location of an audio source relative to a camera based on a lateral position of the audio source in an image frame generated via the camera and a depth factor, the depth factor based on a width of the image frame;
generate a left audio sample and a right audio sample by applying, based on the spatial location of the audio source, an audio spatialization filter to a single-channel audio signal generated by a microphone, the single-channel audio signal associated with the audio source; and
combine the left audio sample and the right audio sample to generate a spatial audio sample corresponding to the spatial location of the audio source.

14. The at least one non-transitory machine-readable storage medium of claim 13, wherein the machine-readable instructions are to cause one or more of the at least one processor circuit to determine the spatial location of the audio source as an azimuth angle.

15. The at least one non-transitory machine-readable storage medium of claim 14, wherein the audio source is a person speaking and the machine-readable instructions are to cause one or more of the at least one processor circuit to:
detect a face of the person speaking in the image frame;
generate a bounding box of the face of the person speaking in the image frame;
determine the lateral position within the image frame of the person speaking based on a location of the bounding box; and
determine a proximity of the person speaking with respect to the camera based on a size of the bounding box.

16. The at least one non-transitory machine-readable storage medium of claim 15, wherein the machine-readable instructions are to cause one or more of the at least one processor circuit to determine the depth factor based on the proximity.

17. The at least one non-transitory machine-readable storage medium of claim 15, wherein the machine-readable instructions are to cause one or more of the at least one processor circuit to determine the proximity of the person speaking to be on a near plane, a medium plane, or a far plane, the near plane located a first distance from the camera, the medium plane located a second distance from the camera, and the far plane located a third distance from the camera, the second distance greater than the first distance and less than the third distance, the third distance greater than the first distance and the second distance.

18. The at least one non-transitory machine-readable storage medium of claim 13, wherein the audio spatialization filter is a head related transfer function.

19. A method comprising:
determining, by at least one processor circuit programmed by at least one instruction, a spatial location of an audio source relative to a camera based on a lateral position of the audio source in an image frame generated via the camera and a depth factor, the depth factor based on a width of the image frame;
generating, based on the spatial location of the audio source, a left audio sample and a right audio sample by applying an audio spatialization filter to a single-channel audio signal generated by a microphone, the single-channel audio signal associated with the audio source; and
combining the left audio sample and the right audio sample to generate a spatial audio sample corresponding to the spatial location of the audio source.

20. The method of claim 19, wherein the audio source is a person speaking and further including:
detecting a face of the person speaking in the image frame;
generating a bounding box of the face of the person speaking in the image frame;
determining the lateral position within the image frame of the person speaking based on a location of the bounding box; and
determining a proximity of the person speaking with respect to the camera based on a size of the bounding box.

* * * * *